Figure 1:
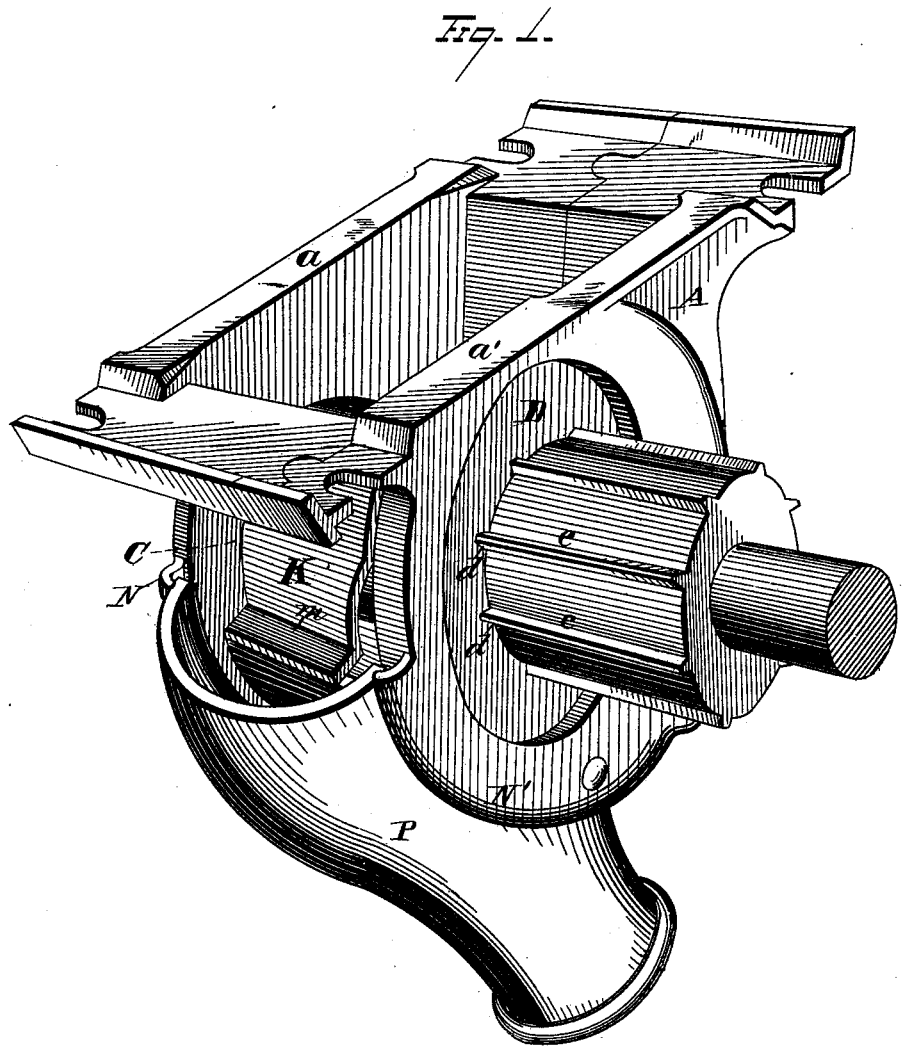

5 Sheets—Sheet 1.

W. A. VAN BRUNT & S. E. DAVIS
Force Feed Seeding-Machine.

No. 208,652. Patented Oct. 1, 1878.

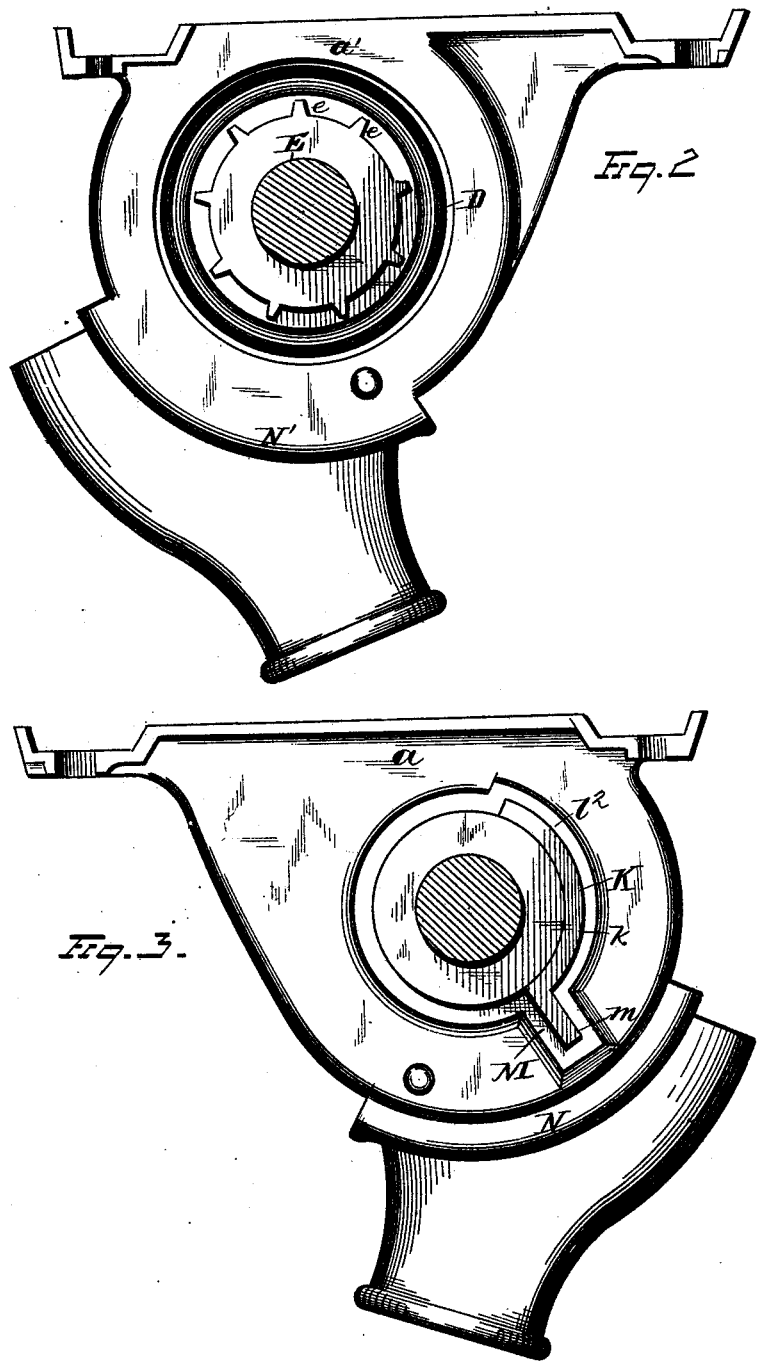

W. A. VAN BRUNT & S. E. DAVIS.
Force Feed Seeding-Machine.
No. 208,652. Patented Oct. 1, 1878.
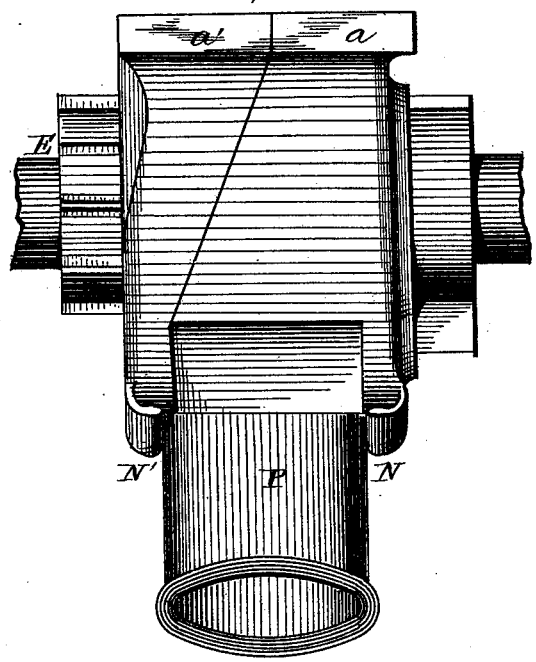
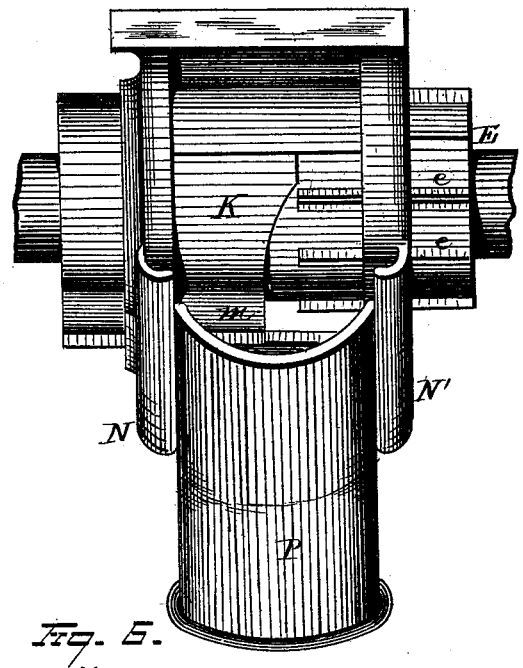
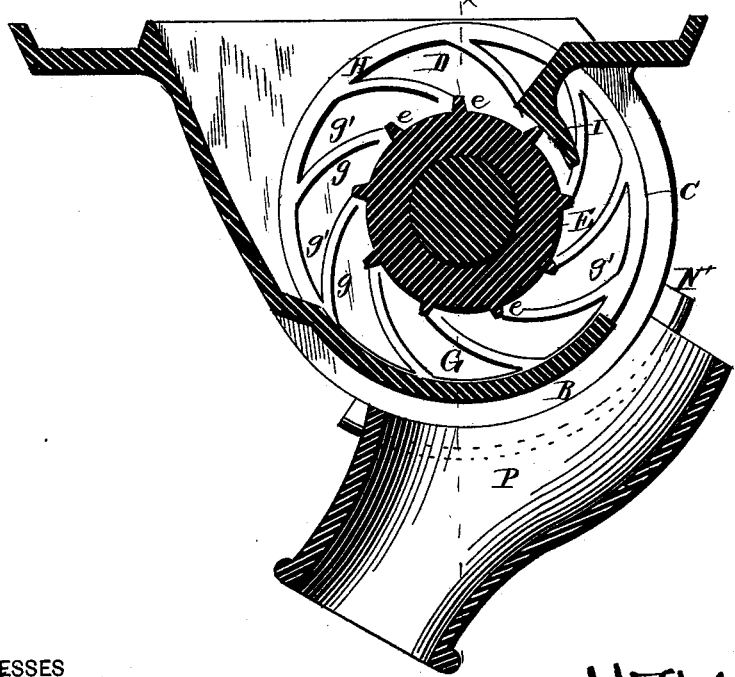

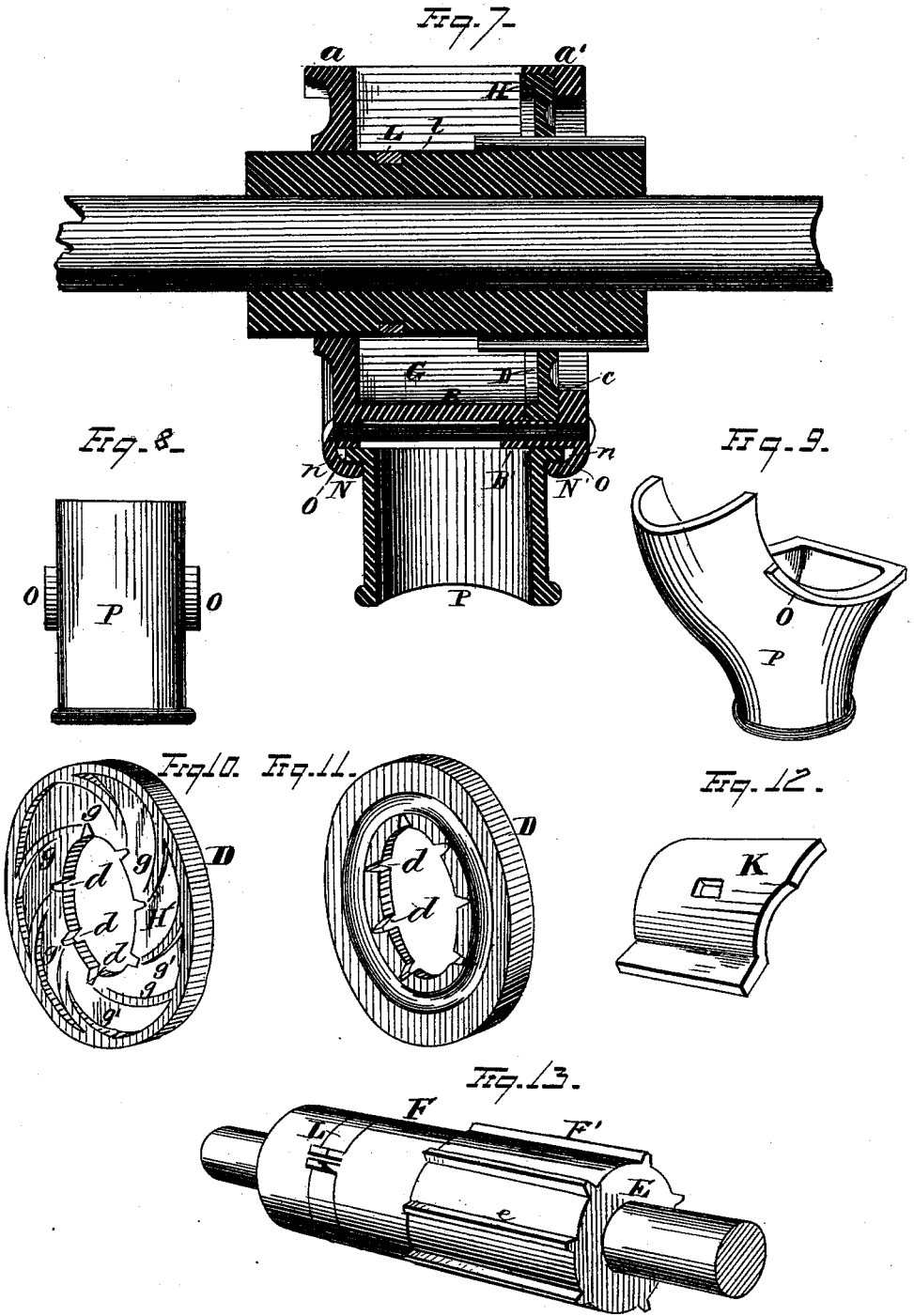

5 Sheets—Sheet 5.

W. A. VAN BRUNT & S. E. DAVIS.
Force Feed Seeding-Machine.

No. 208,652. Patented Oct. 1, 1878.

UNITED STATES PATENT OFFICE.

WILLARD A. VAN BRUNT AND SPENCER E. DAVIS, OF HORICON, WISCONSIN.

IMPROVEMENT IN FORCE-FEED SEEDING-MACHINES.

Specification forming part of Letters Patent No. 208,652, dated October 1, 1878; application filed August 6, 1878.

*To all whom it may concern:*

Be it known that we, WILLARD A. VAN BRUNT and SPENCER E. DAVIS, of Horicon, in the county of Dodge and State of Wisconsin, have invented certain new and useful Improvements in Force-Feed Seeding-Machines; and we do hereby declare the following to be a full, clear, and exact description of the invention, such as will enable others skilled in the art to which it pertains to make and use it, reference being had to the accompanying drawings, which form part of this specification.

Our invention relates to an improvement in force-feed seeding-machines, the object being to provide a force-feed of simple and durable construction, of small initial cost, and effective in operation; and to this end our invention consists, first, in a force-feed for seeding-machines, of a feed-wheel having its flanged or ribbed portion of greater diameter than the smooth portion of the wheel, whereby the feed portion of the wheel is insured a greater frictional contact with the seed within the seed hopper or receptacle.

Our invention further consists in the combination, with a flanged or ribbed feed-wheel, of a notched disk, through which the feed-wheel is adapted to have an endwise movement and impart a rotary motion to said disk, the latter being provided on its inner surfaces with pockets open on their inner ends and bounded on three sides by raised flanges.

Our invention further consists in the combination, with a feed-wheel having ribbed and smooth portions, of a notched disk encircling the ribbed portion of the feed-wheel and adapted to be rotated in unison therewith, said notched disk constructed with a flat face, that extends from the feed-wheel to the casing of the seed-chamber, and with curved or tangential ribs, that gradually increase in depth from the inner to the outer portion of the disk.

Our invention further consists in the combination, with the casing of a force-feed having a discharge-opening formed therein, of a gate attached to the smooth portion of the feed-wheel, and adapted to be reciprocated thereby, and open, close, and regulate the size of the discharge-opening.

Our invention further consists in the combination, with the smooth portion of the feed-wheel and the casing of the force-feed, of a gate attached to the feed-wheel and formed concentric therewith, whereby it fits snugly against the periphery of the same, the lower portion of said gate being provided with an outwardly-projecting flange, which opens and closes the seed-receptacle formed between the casing and the feed-wheel.

Our invention further consists in the combination, with a casing of a force-feed, of a removable spout, attached to the casing in a self-adjustable manner, without the employment of hinges, whereby the spout is adapted to move freely and prevent the binding and kinking of the rubber spouts.

Our invention further consists in the several details of construction and combination of parts, as will hereinafter be described, and pointed out in the claims.

Figure 14:
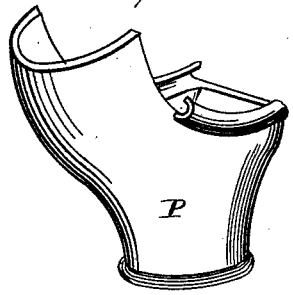
Figure 15:
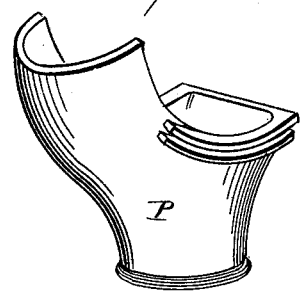
Figure 16:
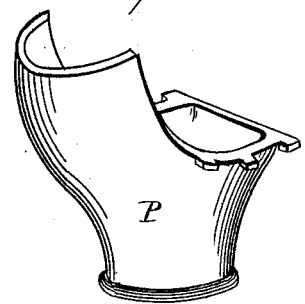

In the accompanying drawings, Figure 1 is a view, in perspective, of our improved force-feed for seeding-machines. Figs. 2 and 3 represent reverse side elevations of the same. Fig. 4 is a front view, and Fig. 5 a rear view. Fig. 6 represents a vertical longitudinal section, and Fig. 7 a vertical transverse section. Fig. 8 is a rear view of the discharge-spout. Fig. 9 is a view, in perspective, of the same. Figs. 10 and 11 are views, in perspective, of the opposite sides of the notched disk. Fig. 12 is a detached view of the gate; and Fig. 13 is a view, in perspective, of the feed-wheel. Figs. 14, 15, and 16 are modification views of the discharge-spout.

A represents the casing of the force-feed, which is preferably cast in two sections, $a$ $a'$. B is the bottom or floor of the seed-chamber, and is cast solid with section $a$ of the casing, and rests upon an inwardly-projecting flange or ledge, B', cast on the opposite section, $a'$, of the casing. C is a discharge-opening, formed in the front portion of the casing, and opposite the side of the feed-wheel. D is an annular ring, which fits within an annular groove, $c$, formed on the inner surface of section $a'$ of the casing. Ring D is provided with notches $d$, corresponding in number, size, and form with the radial flanges or ribs $e$ on the feed-wheel E, which latter extends through the central opening in the ring D; and as the radial flanges $e$ fit within the notches $d$ in the ring, the feed-wheel is adapted to rotate the ring, and also to have an endwise movement or adjustment within said ring.

Feed-wheel E is composed of the smooth portion F and flanged portion F', having any desired number of radial flanges or ribs $e$ formed thereon. The diameter of the flanged portion F' exceeds that of the smooth portion F, whereby the flanged or feeding portion of the wheel may have its periphery as well as its flanges forced in close and direct contact with the seed in the seed-chamber G, and carry the same in any desired quantities to the discharge-opening in the casing. To further facilitate the feed, the annular ring, which constitutes the side wall of the seed-chamber, has tangential or slightly-curved ribs, $g$, of any desired length, and adapted to overlap the radial flanges on the feed-wheel E, formed on its inner surface. The outer ends of said ribs $g$ connect with or merge into an annular flange, H, formed on the outer edge of the annular ring. This form of construction provides seed receptacles or pockets $g'$ in the inner surface of the annular ring D, within which the seed projects, and is carried with the ring and feed-wheel to the discharge-opening.

The annular flange H, while it serves as an outer wall for the several seed-pockets $g'$, also serves as a face-bearing for the ring. The bottom B of the seed-chamber and the segmental flange I at the upper portion of the casing bear against the annular flange H, and thus prevent the lateral displacement of the ring, and operate to retain the same within its annular groove in the casing.

The size of the discharge-opening for regulating the feed is controlled as follows: K represents a segmental gate, the portion $k$ of which is formed concentric with the smooth portion of the feed-wheel, to which it is attached by a ring or collar, L, the latter fitting within an annular groove, $l$, formed in the smooth portion of the feed-wheel. Hence the gate is caused to be reciprocated in unison with the feed-wheel.

When the feed-wheel is moved outwardly from the casing, the gate operates to close the discharge-opening and prevent any escape of seed therefrom. By moving the feed within the casing the gate is moved out of the casing a corresponding distance, and thereby forms a discharge-opening, the size of which depends on the adjustment of the feed-wheel.

The opening in the side wall of the seed-chamber, through which the plane section of the feed-chamber has movement, is formed with a concentrically-recessed portion, $l^2$, adapted to receive the gate, as the latter fits in between the same and said plane section of the feed-cylinder.

Since the ribbed section of the cylinder is greater in diameter than the plane section, it is evident that a space is formed between the same and the top casing of the seed, as said ribbed section is moved from out the latter. The gate secured to the plane section, and moving coincidently with it, fills up and closes said space simultaneously with its formation, so that practically there is no opening allowed to exist between the top casing of the seed-chamber and said feed-cylinder. The recessed portion $l^2$ is provided with a transverse groove, $m$, adapted to receive a flange, M, which is formed on the lower longitudinal edge of the gate, and to permit the same to have horizontal reciprocating movement therein. This flange projects outwardly from the gate and overlaps the outer edge of the discharge-opening.

The lower ends of the casing are provided with segmental flanges N N', having grooves $n$ on their inner surfaces, within which are placed the segmental guides or ledges O, located on opposite sides of the depending spout P. When the upper edge of the casing is in a horizontal line the center of gravity of the freely and self adjustable spout P is shown by the line $x$ $x$ of Fig. 6, and hence it will be impossible to dislodge the spout, owing to any inclination in which the casing may be placed. The spout is adapted to be freely moved through an arc of a circle concentric with the segmental flanges N N', and, by reason of its adaptability to move freely within its guides, it will automatically adjust itself to the variable positions of the frame and rubber spouts.

Instead of having the grooves $n$ on the inner surfaces of the casing, as shown in the drawings, it is apparent that they may be formed on the outer sides or surfaces of the same, and in such instance the segmental guides of the spout P will be outwardly curved, with their locking portions projecting inwardly, as shown in the modification view of Fig. 14; or, in substitution of either of these two forms of sliding connection between the spout and the chamber-casing, we may form the latter with segmental guides or ledges, and provide the spout with grooves corresponding thereto, as shown in modification view of Fig. 15; or, further, instead of using segmental guides or ledges at all, we may employ studs, two or more, formed in proper line on the respective part, either the spout or the casing, said studs having movement in the segmental grooves formed in the other connecting part. In Fig. 16 we show such modified form of engaging mechanism.

From these illustrations of the changes which may be made in the detail character of mechanism employed it will be seen that the principle of our invention is capable of being embodied in many different forms.

From the foregoing description of our improvement it will be observed that a force-feed constructed in accordance with our invention is simple in construction, and nearly, if not all, the parts thereof may be made of cast-iron. The feed is easily regulated, and but little friction is caused in operating the several parts of the device.

It is evident that slight changes may be devised in the construction and arrangement of the several parts of the improvement without departing from the spirit of our invention, and hence we do not limit ourselves to the exact construction shown and described; but, Having fully described our invention, what we claim as new, and desire to secure by Letters Patent, is—

1. In a force-feed for seeding-machines, a feed-wheel consisting of a ribbed or flanged portion, which is provided with radial ribs arranged parallel with the shaft, and a smooth portion, the latter of less diameter than the former, substantially as set forth.

2. The combination, with a feed-wheel constructed of ribbed and smooth portions, of a notched disk encircling the ribbed portion of the feed-wheel, said notched disk constructed with a flat face that extends from the feed-wheel to the casing of the seed-chamber, which face is provided with curved or tangential ribs that gradually increase in depth from the inner to the outer portion of the disk, substantially as set forth.

3. The combination, with a feed-wheel constructed of ribbed and smooth portions, of a notched disk encircling the ribbed portion of the feed-wheel, said notched disk provided with pockets open on their inner ends, and bounded on three sides by raised flanges, substantially as set forth.

4. The combination, with a flanged or ribbed feed-wheel, and a notched disk having curved or tangential ribs, and an annular flange formed on its inner surface, of the casing, a portion of which bears against the annular flange on the annular disk or ring, and prevents the lateral displacement of the same, substantially as set forth.

5. The combination, with a feed-wheel constructed with flanged and smooth portions, of a segmental gate attached to the smooth portion at a point within the casing, and above and without the seed-chamber therein, substantially as set forth.

6. The combination, with a feed-wheel constructed with flanged and smooth portions, of a segmental gate attached to the smooth portion at a point within the casing, and above and without the seed-chamber therein, the lower portion of said gate being provided with an outwardly - projecting flange, which is adapted to open and close the discharge-opening, substantially as set forth.

7. The combination, with a feed-wheel composed of smooth and ribbed portions, the former having an annular groove formed therein at a point within the casing, of a segmental gate attached to the smooth portion by a collar located within said annular groove, and retained on the side of the feed-wheel by the casing, substantially as set forth.

8. The combination, with the casing of a force-feed having flanges formed thereon, of a spout made in single piece, and adapted to be removably secured to the case in a self-adjustable manner, by means of flanges or lugs engaging with said flanges or lugs on the casing, substantially as set forth.

9. The combination, with the casing of a force-feed having depending segmental flanges with grooves on their inner surfaces, of a spout provided with segmental ledges or guides, which fit within the segmental grooves in the flanges on the casing, substantially as set forth.

10. The combination, with a feed-wheel constructed with smooth and ribbed portions, and having a segmental gate attached thereto at a point within the casing, of the casing constructed with a gate-opening formed above the seed-chambers, whereby the segmental portion of the gate is retained on the side of the feed-wheel and without the seed-chamber, substantially as set forth.

11. The combination, with a feed-wheel constructed with smooth and ribbed surfaces, and having a segmental gate provided with an outwardly-projecting flange attached thereto, of the casing formed with an opening in one end thereof for the endwise adjustment of the gate, said opening being located above and without the seed-chamber, the flanged portion of the gate being located on a plane with the discharge-opening, substantially as set forth.

12. In a force-feed, the combination, with a sectional seed-chamber, one of whose sections has the front of the casing formed solid therewith, of a segmental gate attached to the smooth portion of the feed-wheel at a point above and without the seed-chamber, said gate having a flange which projects through an opening in the end of the casing, substantially as set forth.

13. In a force-feed, the combination, with an automatically-adjustable spout, of a casing to which it is removably secured, the two being loosely connected together by segmental grooves formed in the opposite sides of one of the same, and suitable groove-engaging mechanism formed on the corresponding sides of the other, substantially as set forth.

14. In a force-feed, the combination, with an automatically-adjustable spout, of a casing to which it is removably secured, the two being connected together by curved grooves and flanges formed, respectively, on adjacent sides of the same, substantially as set forth.

In testimony that we claim the foregoing we have hereunto set our hands this 22d day of July, 1878.

WILLARD A. VAN BRUNT.
SPENCER E. DAVIS.

Witnesses:
C. L. BUTTERFIELD,
D. D. FRENCH.